(12) United States Patent
Machida (10) Patent No.: US 7,461,873 B2
(45) Date of Patent: Dec. 9, 2008

(54) ACTUATOR AND VEHICLE-MOUNTED ELECTRICALLY OPERATED DEVICE HAVING THE SAME

(75) Inventor: Toshio Machida, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 121 days.

(21) Appl. No.: 11/000,391

(22) Filed: Dec. 1, 2004

(65) Prior Publication Data

US 2005/0121920 A1 Jun. 9, 2005

(30) Foreign Application Priority Data

Dec. 4, 2003 (JP) ............... 2003-406311

(51) Int. Cl.
*E05B 9/00* (2006.01)
(52) U.S. Cl. ................ 292/337; 439/357; 310/71
(58) Field of Classification Search ........... 292/337, 292/201; 439/357; 310/71
See application file for complete search history.

(56) References Cited

U.S. PATENT DOCUMENTS

| | | | |
|---|---|---|---|
| 4,762,348 A | | 8/1988 | Matsumoto |
| 5,328,218 A | * | 7/1994 | Brusasco et al. ............ 292/201 |
| 5,360,351 A | * | 11/1994 | Periou et al. ................ 439/357 |
| 5,516,167 A | | 5/1996 | Hayakawa et al. |
| 5,564,308 A | * | 10/1996 | Hoshikawa et al. ......... 74/89.14 |
| 5,746,076 A | * | 5/1998 | Inoue .......................... 70/277 |
| 6,059,328 A | | 5/2000 | Gomi |
| 6,109,674 A | * | 8/2000 | Bartel et al. ................ 292/337 |
| 6,131,337 A | | 10/2000 | Machida |
| 6,191,512 B1 | * | 2/2001 | Lekeux et al. ............... 310/89 |
| 6,457,753 B1 | * | 10/2002 | Wegge ....................... 292/216 |
| 6,557,911 B2 | * | 5/2003 | Nelsen et al. ............... 292/216 |
| 6,565,131 B2 | * | 5/2003 | Roos .......................... 292/201 |
| 6,637,783 B2 | * | 10/2003 | Takamura ................... 292/201 |
| 6,641,184 B2 | * | 11/2003 | Erices et al. ................ 292/216 |
| 6,927,514 B2 | * | 8/2005 | Nesic ......................... 310/89 |
| 7,038,337 B2 | * | 5/2006 | Thomson et al. ............ 310/71 |

FOREIGN PATENT DOCUMENTS

GB    2 329 928 A    4/1999

OTHER PUBLICATIONS

European Search Report issued in corresponding EP 04 02 8624, Jul. 30, 2008, EPO, The Hague, NL.

* cited by examiner

*Primary Examiner*—Gary Estremsky
(74) *Attorney, Agent, or Firm*—Buchanan Ingersoll & Rooney PC (57) ABSTRACT

An actuator for driving an operating mechanism that operates an operated member of a vehicle by means of a driving of an electric drive source includes a housing for supporting the electric drive source, a detecting means for detecting an operation status of the operated member or the operating mechanism, a switch connector including an output terminal provided as an electric path from the detecting means, and a power feeding connector formed on the housing and including an input terminal provided as an electric path to the electric drive source and a first engaging portion onto which the switch connector is fit.

16 Claims, 11 Drawing Sheets

ACTUATOR AND VEHICLE-MOUNTED ELECTRICALLY OPERATED DEVICE HAVING THE SAME

CROSS REFERENCE TO RELATED APPLICATIONS

This application is based on and claims priority under 35 U.S.C. § 119 to Japanese Patent Application 2003-406311, filed on Dec. 4, 2003, the entire content of which is incorporated herein by reference.

FIELD OF THE INVENTION

This invention generally relates to a vehicle-mounted electrically operated device such as a lock device and an opening and closing device of an operated member (i.e. an opening and closing member such as a door, hood, rid, tail gate, window panel, roof panel) operated by an actuator having an electric drive source such as an electric motor.

BACKGROUND

A known vehicle door lock apparatus is disclosed in U.S. Pat. No. 5,516,167 as a vehicle-mounted electrically operated device. The vehicle door lock apparatus disclosed includes an actuator having an electric motor driven by receiving a power from a power source mounted in a vehicle, a lever mechanism for switching, by means of an operation of the electric motor, a door latch mechanism between a locked state and an unlocked state, a switch mechanism for detecting whether the lever mechanism is in a locked position or an unlocked position, and a control device for controlling an operation of the electric motor based on a signal from the switch mechanism. According to the door lock apparatus disclosed, a connector having an output terminal for electrically connecting the switch mechanism accommodated in the door latch mechanism to the control device, and an input terminal for electrically connecting the electric motor accommodated in the actuator to the control device is integrally formed in a housing of the actuator.

In this case, however, the switch mechanism is accommodated in the door latch mechanism, not the actuator, and thus the switch mechanism and the output terminal are connected by a lead wire. In addition, a number of output terminals is required to respond to a number of switch mechanisms is required. The output terminal is provided in a connector integrally formed in the housing, thereby causing the output terminal to be connected to the lead wire when the actuator and the door latch mechanism are assembled to each other. The assembly between the actuator and the door latch mechanism may accordingly be complicated.

Thus, a need exists for a vehicle-mounted electrically operated device in which the effectiveness of an electric wiring connection at a time that an operated member or an operating mechanism to which a detecting means attached, and an actuator are assembled can be enhanced. The present invention has been made in view of the above circumstances and provided such a device.

SUMMARY OF THE INVENTION

According to an aspect of the present invention, an actuator for driving an operating mechanism that operates an operated member of a vehicle by means of a driving of an electric drive source includes a housing for supporting the electric drive source, a detecting means for detecting an operation status of the operated member or the operating mechanism, a switch connector including an output terminal provided as an electric path from the detecting means, and a power feeding connector formed on the housing and including an input terminal provided as an electric path to the electric drive source and a first engaging portion onto which the switch connector is fit.

According to another aspect of the present invention, a vehicle-mounted electrically operated device includes an actuator including an electric drive source controlled by a control means mounted on the vehicle and receiving an electric power from a power source mounted on the vehicle, an operating mechanism for operating an operated member of the vehicle by means of a driving of the electric drive source, a detecting means for detecting an operation status of the operated member or the operating mechanism and outputting a detection signal to the control means, a first connector including a first connection terminal for electrically connecting the detecting means to the control means, and a second connector formed on the actuator and with which the first connector is engageable and disengageable, the second connector including a second connection terminal for electrically connecting the electric drive source to the control device.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention are explained with reference to the attached drawings.

Figure 1:
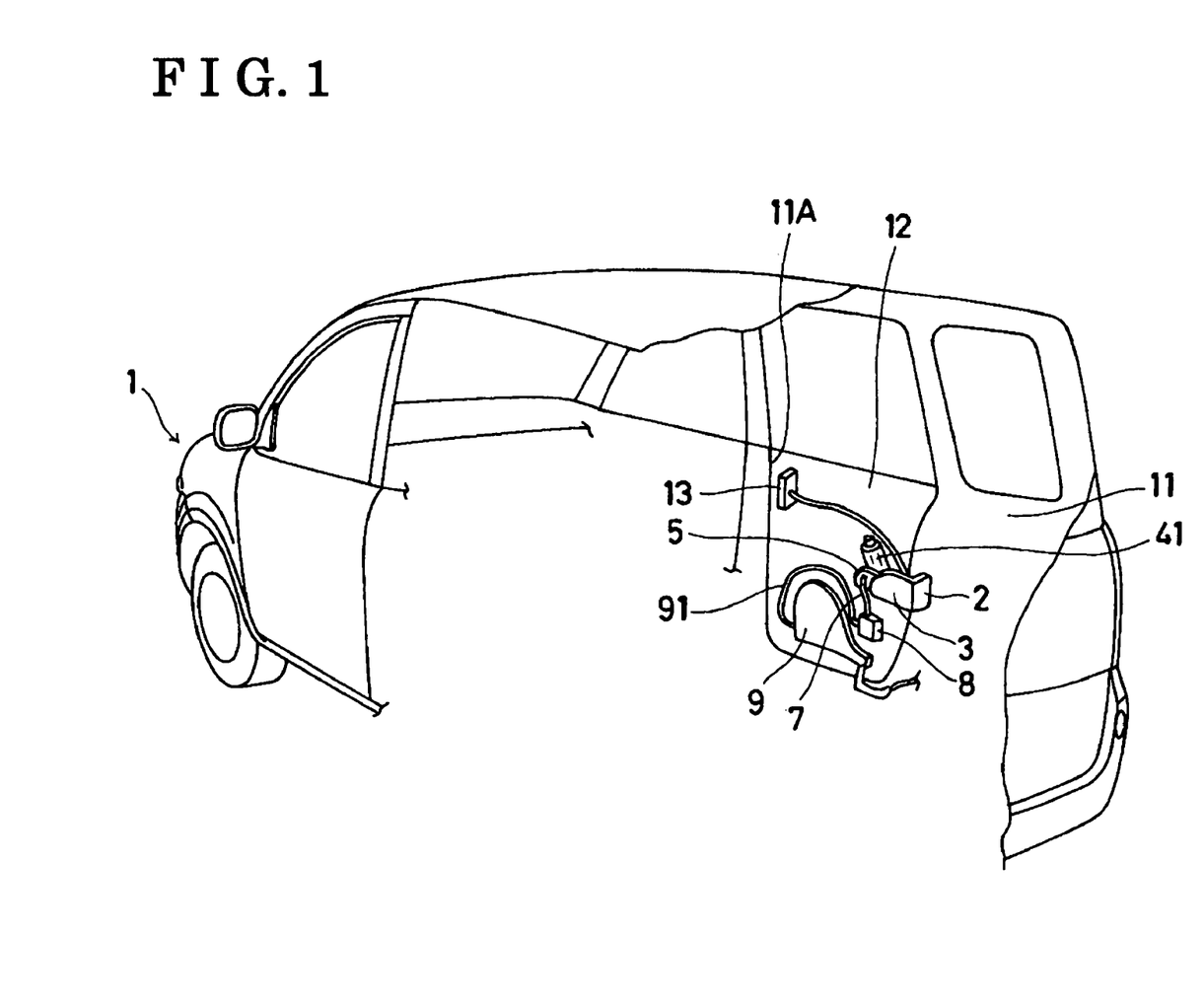
FIG. 1 is a perspective view of a vehicle in which an electrically operated device is installed according to an embodiment of the present invention.

As shown in FIG. 1, a sliding door 12 for opening and closing an entrance 11A formed on a side body 11 is supported on a vehicle 1, the sliding door 12 slidable in a vehicle longitudinal direction. The sliding door 12 accommodates therein both a door latch mechanism 2 for holding the sliding door 12 in a fully closed state or in a half-closed state, and a door closure mechanism 3 for operating the door latch mechanism 2 in such a way that the sliding door 12 can be changed from a half-closed state to a fully closed state.

Figure 2:
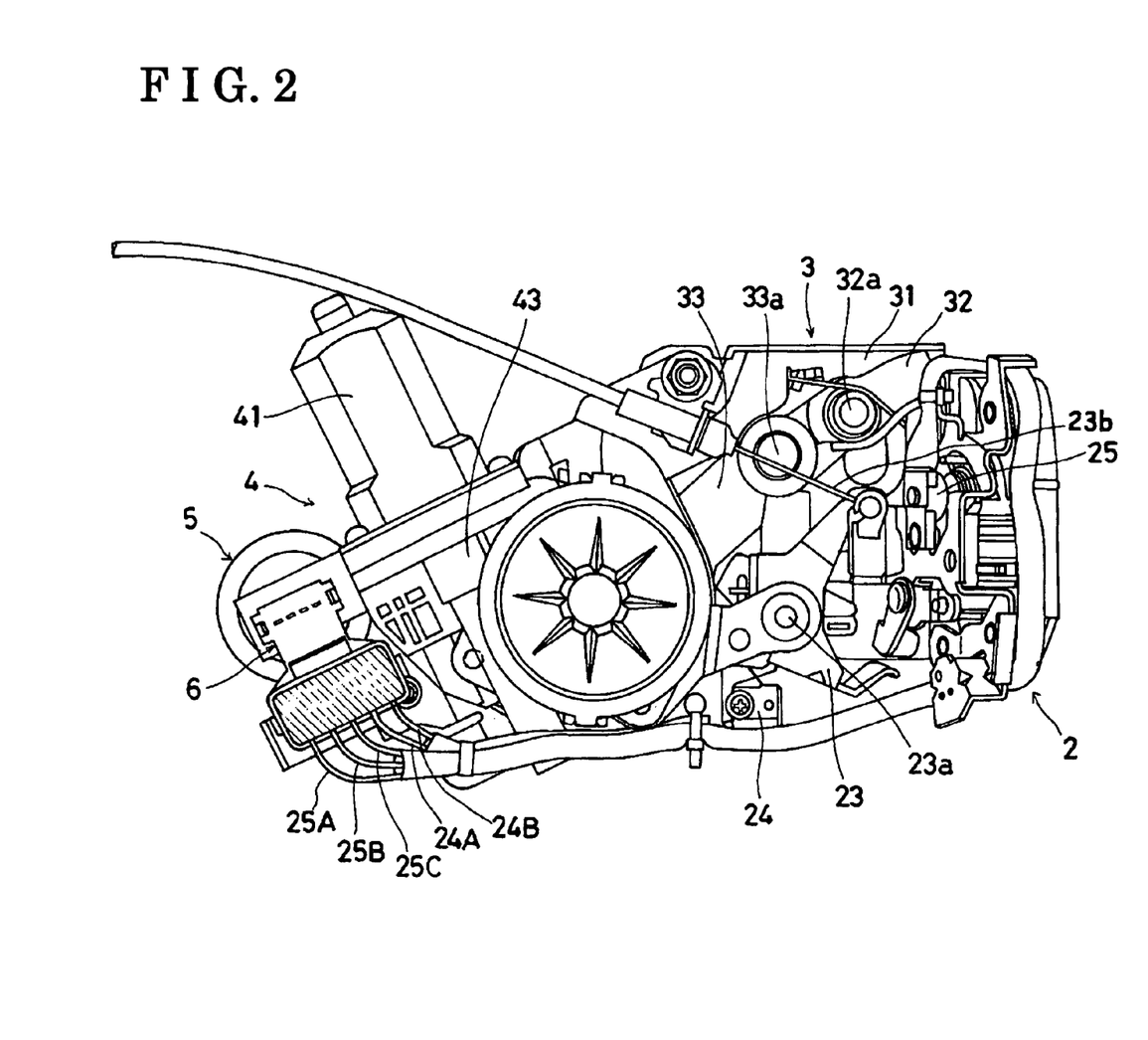
FIG. 2 is a plane view of the electrically operated device according to the embodiment of the present invention.
Figure 3:
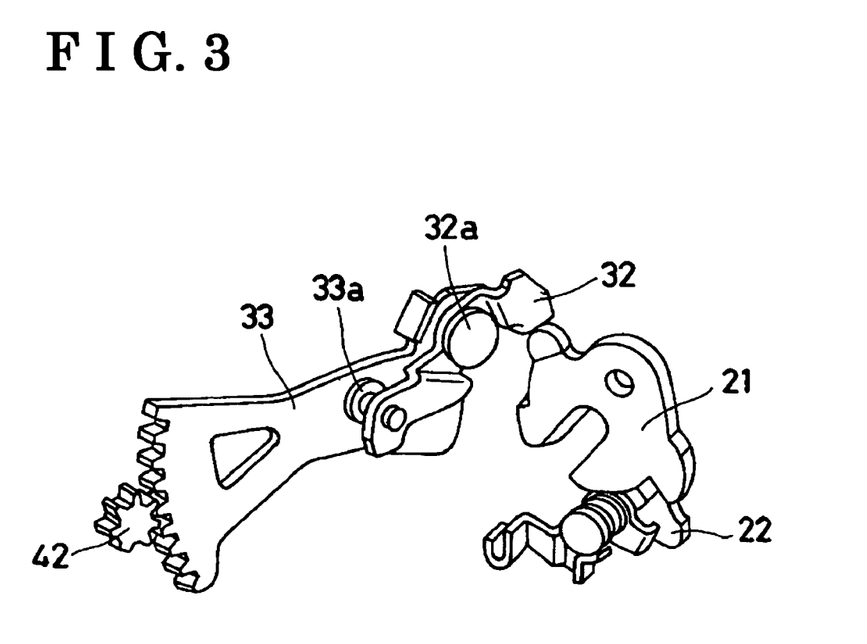
FIG. 3 is a perspective view showing an operation of the electrically operated device according to the embodiment of the present invention.

As shown in FIGS. 2 and 3, the door latch mechanism 2 and the door closure mechanism 3 are unitized by a bracket 31 into a generally known structure. The door latch mechanism 2 includes both a latch 21, which, in a state where the striker and the latch 21 are engaged with each other, is rotatably engageable and disengeagable with a striker (not shown) provided at an edge of the entrance 11A, and a pawl 22, which is rotatably engageable and disengageable with the latch 21. The sliding door 12 is either fully closed or half-closed, depending on an engaging position of the pawl 22 relative to the latch 21 when the latch 21 is in an engaging state with the striker. The door closure mechanism 3 includes a passive lever 32 that can make contact with the latch 21, and a driven gear 33 rotatably supported on the bracket 31 by means of a pin 33a. The driven gear 33 rotatably supports the passive lever 32 by means of a pin 32a. In addition, the driven gear 33 meshes with an output pinion gear 42 of an actuator 4 whose drive source is an electric motor 41. A driving force of the electric motor 41 is transmitted to the passive lever 32 via the driven gear 33. When the electric motor 41 is driven, the passive lever 32 is rotated so that the passive lever 32 makes contact with the latch 21 via the driven gear 33. As a result of the contact made by the passive lever 32 with the latch 21, the latch 21 is then rotated so as to shift the sliding door 12 from a half-closed state to a fully closed state.

As shown in FIG. 2, an open lever 23 is rotatably supported on the bracket 31 by means of a pin 23a. One end of the open lever 23 is connected to a door inside handle 13 (see FIG. 1), while the other end of the open lever 23 is arranged in such a way that the open lever 23 can make contact with the pawl 22. When the door inside handle 13 is operated to rotate the open lever 23, the other end of the open lever 23 makes contact with the pawl 22 and thereby rotates the pawl 22. Then, the engagement between the pawl 22 and the latch 21 is released, and thus the sliding door 12 can be shifted from a half-closed state, or from a fully closed state, to an open state. The open lever 23 is also connected to a door outside handle (not shown).

As shown in FIG. 2, the actuator 4 includes a housing 43 accommodating a deceleration gear mechanism containing multiple gears therein. An input side of the deceleration gear mechanism is connected to the electric motor 41 in such a way that power transmission is possible therebetween, while an output side of the deceleration gear mechanism is connected to the output pinion gear 42 in such a way that power transmission is possible therebetween. The housing 43 is fixed on the bracket 31 for supporting the electric motor 41. In addition, a power feeding connector 5 is integrally formed on the housing 43 for supplying the power to the electric motor 41.

As shown in FIG. 2, an open switch 24 is supported on the bracket 31 for detecting, as the open switch 24 makes contact with the open lever 23 in a rotational state, whether the door inside handle 13 has been operated. In addition, a latch switch 25 is supported on the bracket 31 for detecting, as the latch switch 25 makes contact with the latch 21 in a rotational state, whether the sliding door 12 in a half-closed state, a fully closed state, or an open state. The open switch 24 includes two wire harnesses 24A and 25B, which are tied together, while the latch switch 25 includes three wire harnesses 25A, 24B and 25C which are tied together. The wire harnesses 24A, 24B, 25A, 25B, and 25C are electrically connected by a single switch connector 6 to the power feeding connector 5 formed on the actuator 4.

The switch connector 6 according to the first embodiment is explained below.

Figure 5:
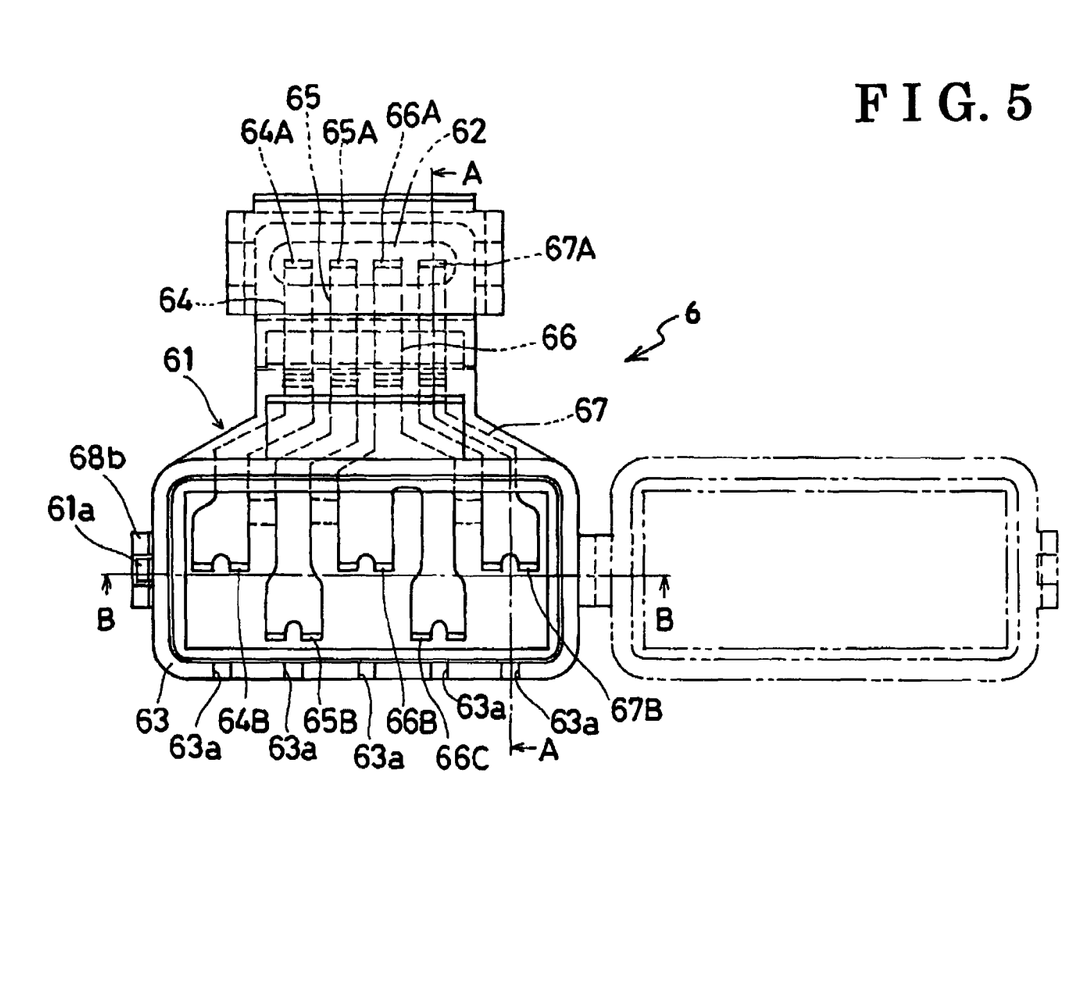
FIG. 5 is a plane view of a switch connector of the electrically operated device according to the first embodiment of the present invention.
Figure 6:
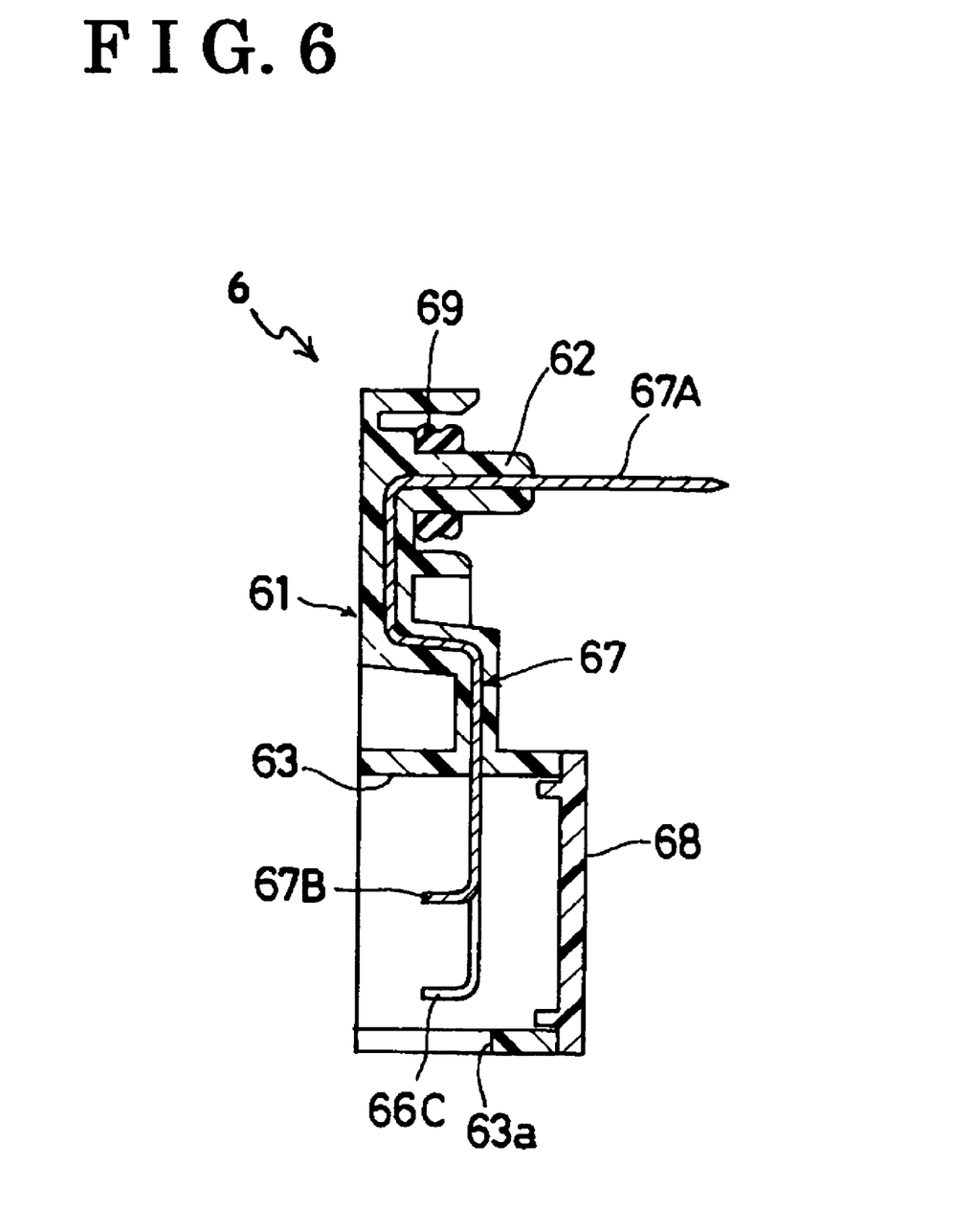
FIG. 6 is a cross-sectional view taken along the line A-A of FIG. 5.
Figure 7:
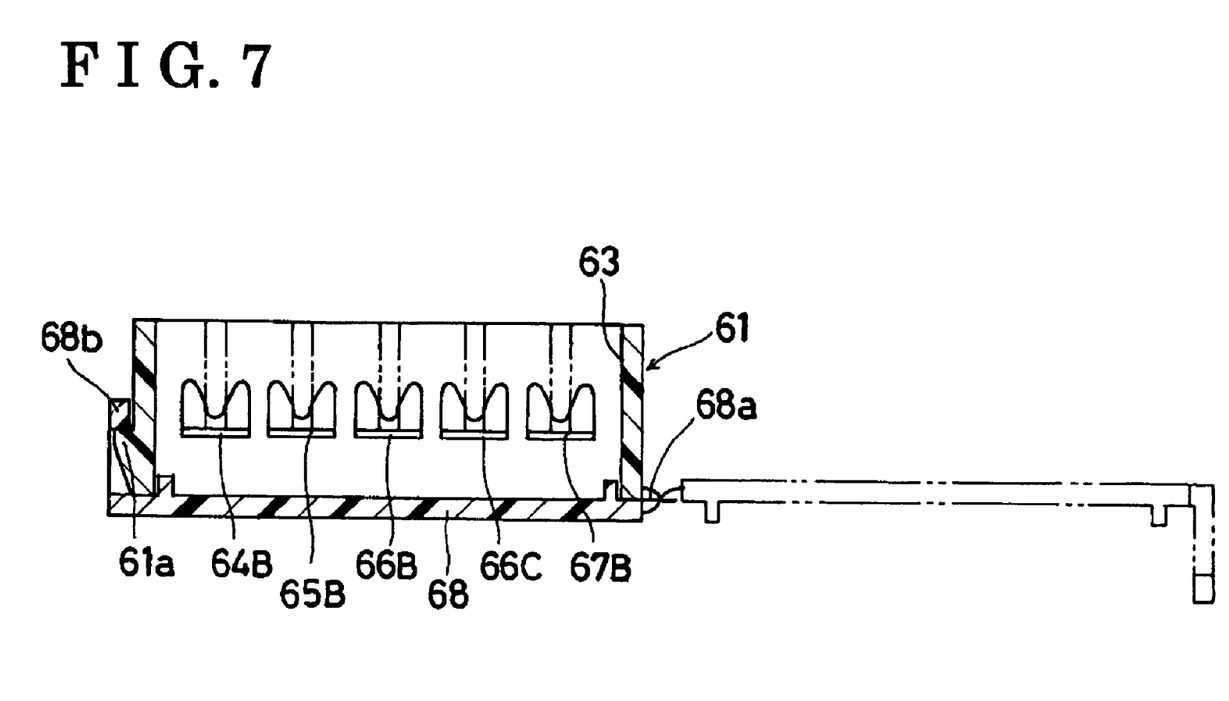
FIG. 7 is a cross-sectional view taken along the line B-B of FIG. 5.

As shown in FIGS. 5 to 7, the switch connector 6 includes a synthetic-resin connector main body 61. An engaging convex portion 62 to be fit onto the power feeding connector 5, and a cylindrical accommodating portion 63 both of whose ends are opened, are formed on the connector main body 61. Four output terminals 64, 65, 66, and 67 are fixed by means of insert molding onto the connector main body 61. One end of each of the output terminals 64, 65, 66, and 67 extends to outwards from a first end face of the engaging convex portion 62, thus forming terminal connection portions 64A, 65A, 66A, and 67A. Another, second end of each of the output terminals 64, 65, 66, and 67 extends into the cylindrical accommodating portion 63, thus forming harness connection portions 64B, 65B, and 67B. The other, second end of the output terminal 66 is divided into two pieces and extends into the cylindrical accommodating portion 63, thus forming harness connection portions 66B and 66C. In addition, five slits 63a are formed on the cylindrical accommodating portion 63, facing the harness connection portions 64B, 65B, 66B, 66C, and 67B. The wire harnesses 24A and 24B of the open switch 24 are electrically connected to the harness connection portions 66C and 67B respectively through the respective slits 63a. The wire harnesses 25A, 25B, and 25C of the latch switch 25 are electrically connected to the harness connection portions 64B, 65B, and 66B respectively through the respective slits 63a.

A cover member 68 having substantially an identical shape to that of the opening provided at a first end of the cylindrical accommodating portion 63 is integrally formed on the connector main body 61 by means of a rotation hinge portion 68a. As shown in FIG. 7, an engaging projection 68b formed on an opposite end of the cover member 68 to the hinge portion 68a engages with an engaging hook 61a formed on the connector main body 61, thereby closing the opening provided at the first end of the cylindrical accommodating portion 63. The inside of the cylindrical accommodating portion 63 is insulated by means of a waterproof hot-melt process applied with the first end of the cylindrical accommodating portion 63 in a closed state. Since, according to the employment, the cylindrical accommodating portion 63 is closed by the cover member 68, in circumstances where the output terminals 64, 65, 66, and 67 are insert-molded within the connector main body 61, the respective positions of the output terminals 64, 65, 66, and 67 can be easily maintained while at the same time a waterproof hot-melt process is possible within the cylindrical accommodating portion 63. In addition, the cover member 68 is integrally formed on the connector main body 61 by means of the rotation hinge portion 68a and by utilizing the cover member 68 any increases in the number of parts may be avoided.

Next, the power feeding connector 5 according to the first embodiment is explained below.

Figure 4:
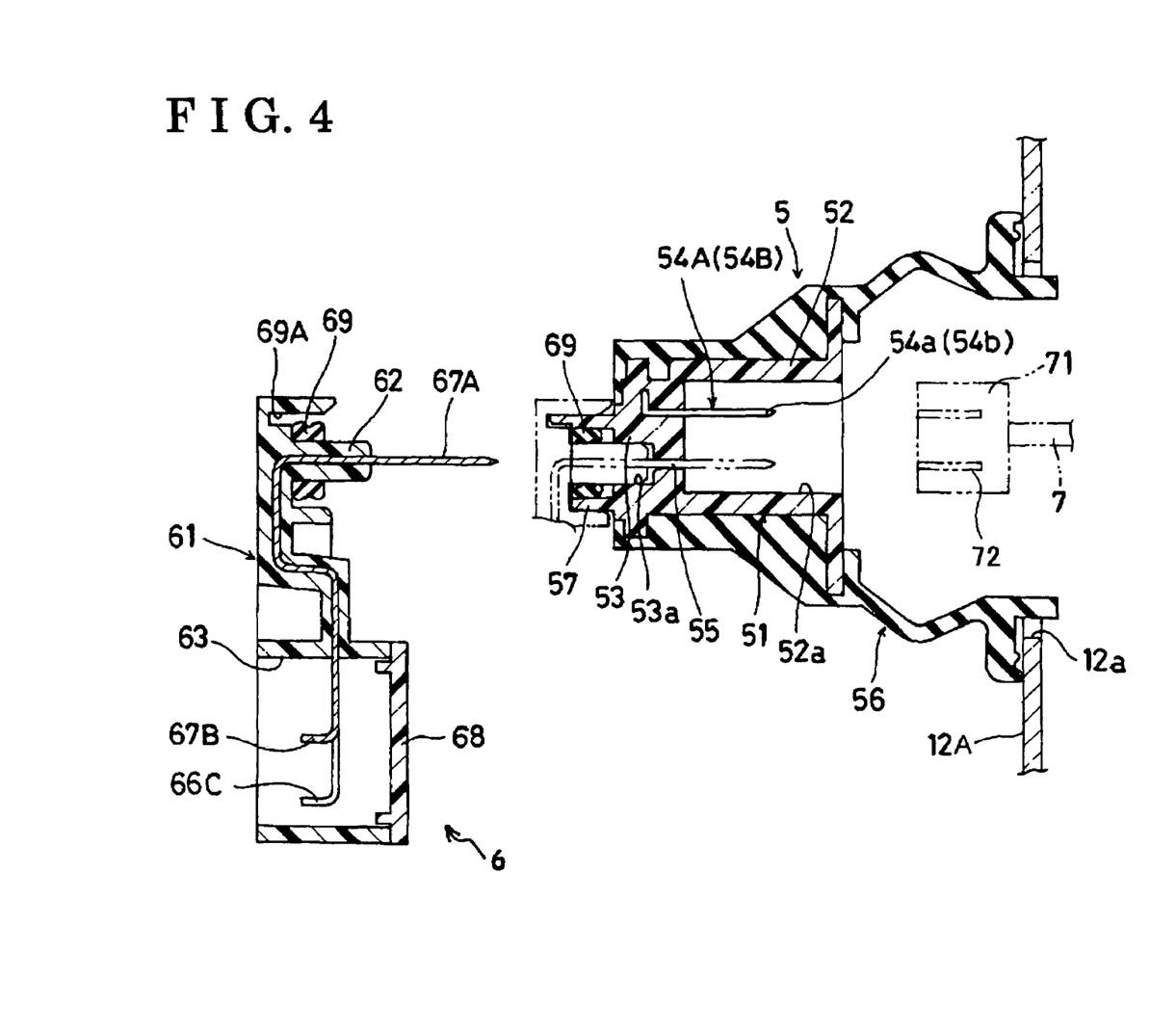
FIG. 4 is a cross-sectional view of a feeding connector of the electrically operated device according to a first embodiment of the present invention.

As shown in FIG. 4, the power feeding connector 5 includes a synthetic-resin connector main body 51 having a cylindrical shape. A first engaging concave portion 52 having an opening is formed on a first end of the connector main body 51, while a second engaging concave portion 53 having an opening is formed on the other, second, end of the connector main body 51. A connector 71 for multiple wire harnesses 7 tied together, is positioned within the first engaging concave portion 52 while the switch connector 6 is positioned within the second engaging concave portion 53. Two input terminals 54A and 54B, whose respective end tip portions extend into a first concave portion 52a of the first engaging concave portion 52, are fixed by means of insert molding onto a portion provided as a bottom wall for both the engaging concave portions 52 and 53 of the connector main body 51. In addition, four through-holes 55 are formed on the bottom wall in parallel to the input terminals 54A and 54B, for purposes of connecting the first concave portion 52a of the first engaging concave portion 52 with a second concave portion 53a of the second engaging concave portion 53. The input terminals 54A and 54B are electrically connected to a pair of electrodes (not shown) of the electric motor 41.

The first concave portion 52a of the first engaging concave portion 52 faces a through-hole 12a formed on a door inner panel 12A of the sliding door 12. The surroundings of the first engaging concave portion 52 and the through-hole 12a are covered by an accordion-shaped seal member 56.

The engaging convex portion 62 of the switch connector 6 is positioned within the second concave portion 53a of the second engaging concave portion 53 by means of a seal member 69. The terminal connection portions 64A, 65A, 66A, and 67A, respectively of the output terminals 64, 65, 66, and 67 of the switch connector 6 are inserted into the respective through-holes 55 of the connector main body 51, and arranged within the first concave portion 52a of the first engaging concave portion 52 in such a manner that the terminal connection portions 64A, 65A, 66A, and 67A are substantially in parallel to the terminal connection portions 54a and 54b of the input terminals 54A and 54B. Further, in order to assure the engagement of the switch connector 6 with the power feeding connector 5, an annular groove 69A, in the vicinity of which the seal member 69 is provided, is formed around the engaging convex portion 62 of the switch connector 6. Then, an annular flange 57, to be positioned within the groove 69A, is formed to project around the second concave portion 53a of the second engaging concave portion 53. The engaging strength between the switch connector 6 and the power feeding connector 5 is assured by the engagement between the flange 57 and the groove 69A.

The connector 71 for the wire harnesses 7 which have been tied together is led to the first concave portion 52a through the through-hole 12a and an inner side of the seal member 56, and then positioned at the power feeding connector 5 within the engaging concave portion 52. As a result, the input terminals 54A and 54B, and the output terminals 64, 65, 66, and 67, are electrically connected to the wire harnesses 7 via multiple connection terminals 72 of the connector 71. An inner peripheral face of the first concave portion 52a functions as a guide face for the connector 71, thereby assuring the accuracy of positional relationships between, on the one hand, the input terminals 54A and 54B, and the output terminals 64, 65, 66, and 67, and, on the other hand, the connection terminals 72.

Next, the switch connector 6 according to a second embodiment is explained below.

Figure 9:
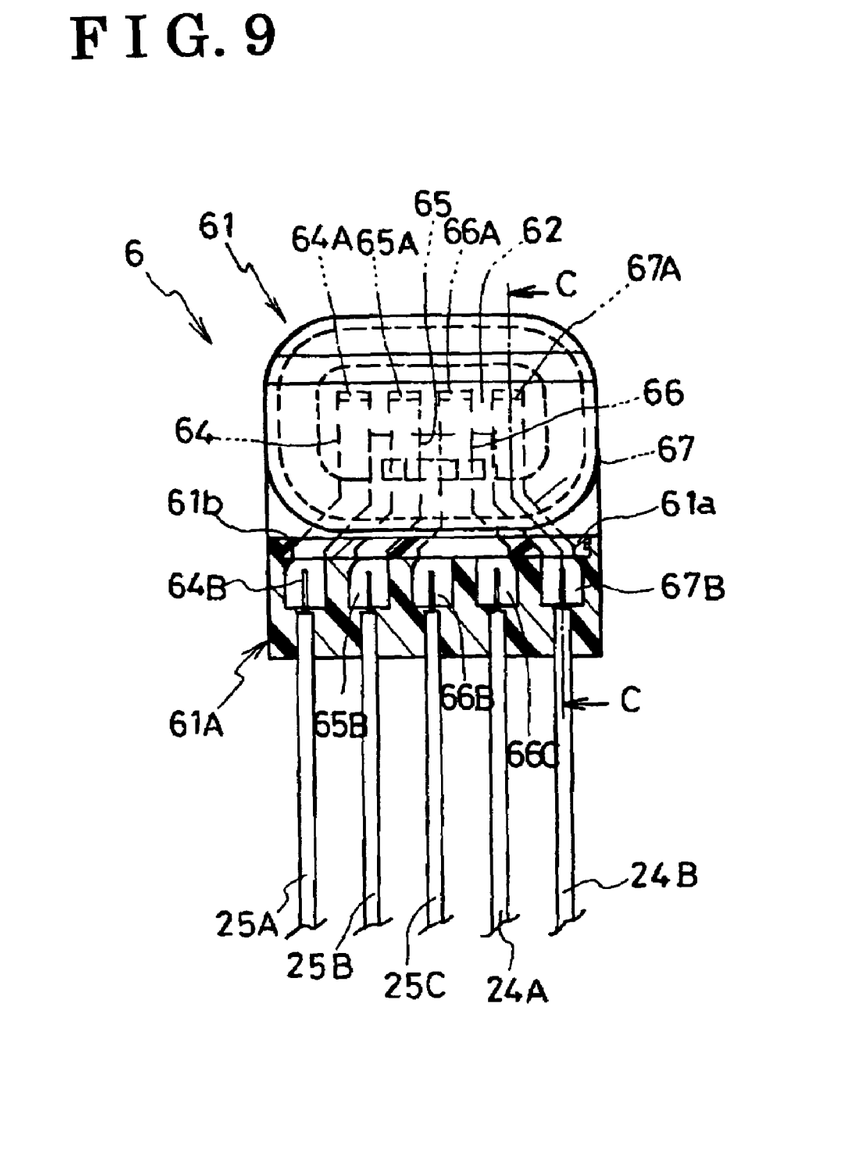
FIG. 9 is a plane view of the switch connector of the electrically operated device according to the second embodiment of the present invention.
Figure 10:
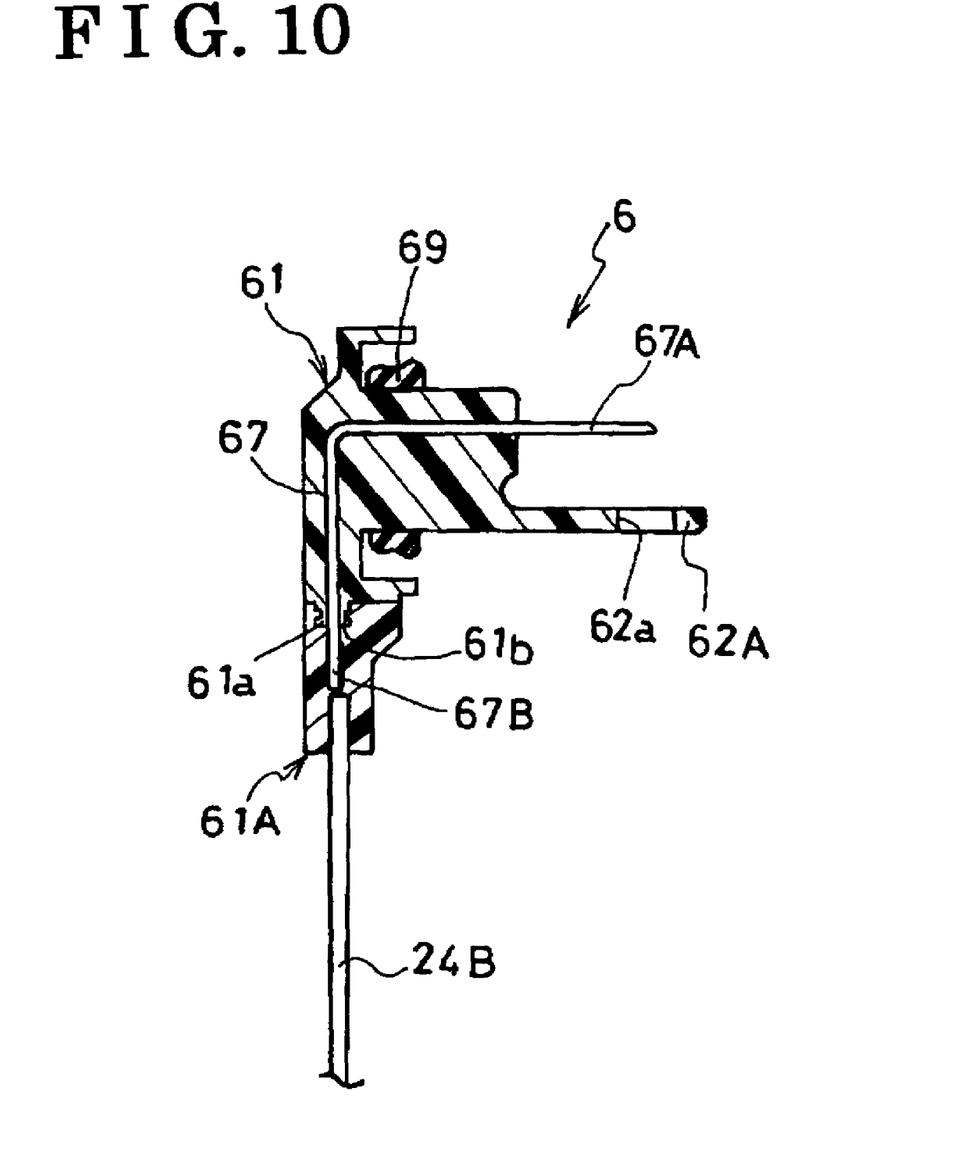
FIG. 10 is a cross-sectional view taken along the line C-C of FIG. 9.

As shown in FIGS. 9 and 10, the switch connector 6 includes a synthetic-resin connector main body 61. An engaging convex portion 62, to be fit onto a power feeding connector 5, is formed on the connector main body 61. Four output terminals 64, 65, 66, and 67 are fixed by means of insert molding onto the connector main body 61. One end of each of the output terminals 64, 65, 66, and 67 extends outwards from an end face of the engaging convex portion 62, thus forming terminal connection portions 64A, 65A, 66A, and 67A. Another, second end of the output terminals 64, 65, 66, and 67 extends outwards from an opposite end face of the engaging convex portion 62, thus forming harness connection portions 64B, 65B, and 67B. The other, second end of the output terminal 66 is divided into two pieces and extends outwards from the opposite end face of the engaging convex portion 62 in the same way as the harness connection portions 64B, 65B, and 67B. Wire harnesses 24A and 24B of an open switch 24 are electrically connected to the harness connection portions 66C and 67B. Wire harnesses 25A, 25B, and 25C of a latch switch 25 are electrically connected to the harness connection portions 64B, 65B, and 66B. The harness connection portions 64B, 65B, 66B, 66C, and 67B are covered with a cover member 61A which is integrally formed on the connector main body 61 by resin-molding, and electrically insulated. In order to enhance mechanical strength between the connector main body 61 and the cover member 61A, an engaging hook 61a formed on the connector main body 61 and an engaging concave portion 61b engage with each other.

The power feeding connector 5 according to the second embodiment is explained as follows.

Figure 8:
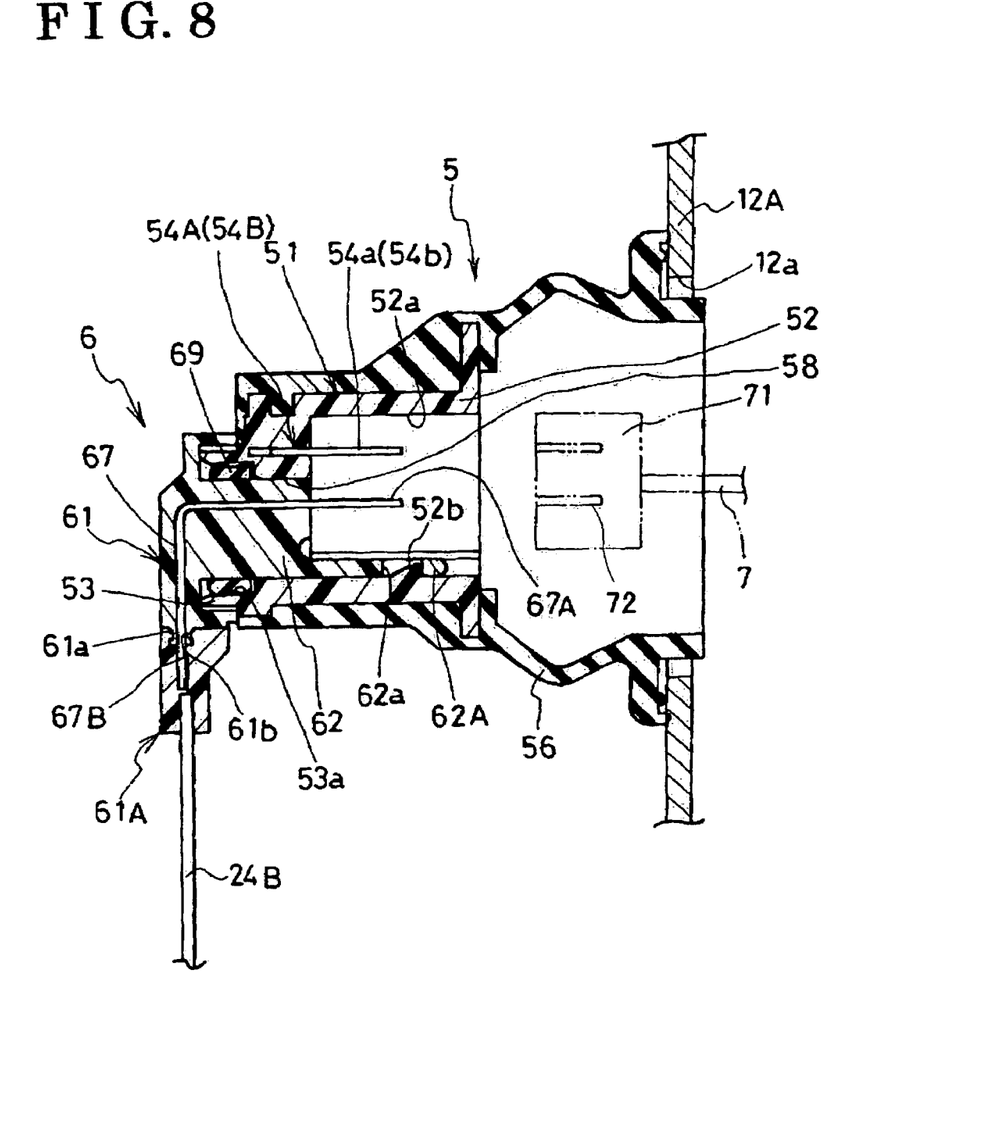
FIG. 8 is a cross sectional view of the feeding connector of the electrically operated device according to a second embodiment of the present invention.

As shown in FIG. 8, the power feeding connector 5 includes a synthetic-resin connector main body 51 having a cylindrical shape. A first engaging concave portion 52 having an opening is formed on a first end of the connector main body 51, while a second engaging concave portion 53 having an opening is formed on the other, second, end of the connector main body 51. A connector 71, for multiple wire harnesses 7 tied together, is positioned within the first engaging concave portion 52 while the switch connector 6 is positioned within the second engaging concave portion 53. Two input terminals 54A and 54B, whose respective end tip portions extend into the first concave portion 52a of the first engaging concave portion 52, are fixed by means of insert molding onto a portion provided as a bottom wall for both the engaging concave portions 52 and 53 of the connector main body 51. In addition, a through-hole 58 is formed on the bottom wall, in parallel to the input terminals 54A and 54B, for purposes of connecting the first concave portion 52a of the first engaging concave portion 52 with the second concave portion 53a of the second engaging concave portion 53. The input terminals 54A and 54B are electrically connected to a pair of electrodes (not shown) of the electric motor 41.

The first concave portion 52a of the first engaging concave portion 52 faces a through-hole 12a formed on a door inner panel 12A of the sliding door 12. The surroundings of the first engaging concave portion 52 and the through-hole 12a are covered by an accordion-shaped seal member 56.

The engaging convex portion 62 of the switch connector 6 is positioned within the second concave portion 53a of the second engaging concave portion 53 by means of a seal member 69. The terminal connection portions 64A, 65A, 66A, and 67A, respectively of the output terminals 64, 65, 66, and 67 of the switch connector 6, are inserted, together with the engaging convex portion 62, into the through-hole 58 of the connector main body 51 and arranged within the first concave portion 52a of the first engaging concave portion 52 in such a manner that the terminal connection portions 64A, 65A, 66A and 67A are substantially in parallel to the terminal connection portions 54a and 54b of the input terminals 54A and 54B. A flange arm 62A, including an engaging hole 62a, is formed to extend to an end tip of the engaging convex portion 62. In addition, an engaging hook 52b, which can engage with the engaging hole 62a, is formed on an inner periphery of the first convex portion 52a. By virtue of the engagement between the engaging hole 62a and the engaging hook 52b, the switch connector 6 is prevented from disengaging from the power feeding connecter 5.

The connector 71 for the wire harnesses 7 which have been tied is led to the first concave portion 52a through the through-hole 12a and an inner side of the seal member 56, and then positioned at the power feeding connector 5 within the engaging concave portion 52. As a result, the input terminals 54A and 54B, and the output terminals 64, 65, 66 and 67, are electrically connected to the wire harnesses 7 via multiple connection terminals 72 of the connector 71. An inner peripheral face of the first concave portion 52a functions as a guide face for the connector 71, thereby assuring the accuracy of the positional relationships between, on the one hand, the input terminals 54A and 54B, and the output terminals 64, 65, 66, and 67, and, on the other hand, the connection terminals 72.

Figure 11:
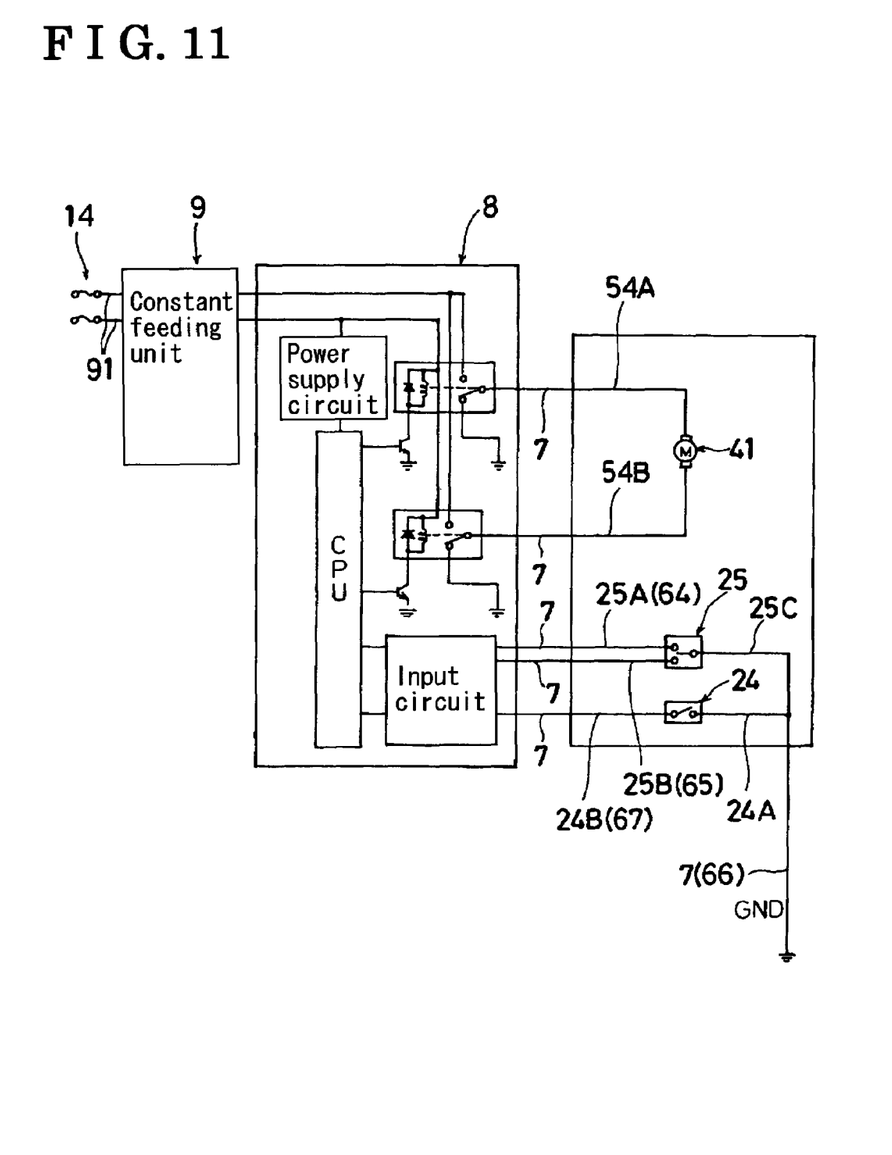
FIG. 11 is a circuit diagram showing a control means of the electrically operated device according to the embodiment of the present invention.

As shown in FIGS. 1 and 11, the tied wire harnesses 7 are electrically connected to an electronic control unit 8 provided on the inside of the sliding door 12. The electronic control unit 8 controls driving of the electric motor 41 of the actuator 4 on the basis of signals received from the open switch 24 and the latch switch 25. In addition, the electronic control unit 8 is electrically connected to a battery 14 mounted on the vehicle 1 by means of a feeding cable 91, which is routed from the inside of the sliding door 12 to the side body 11 by means of a constant feeding unit 9 provided within the sliding door 12.

According to the aforementioned embodiments, the wire harnesses 24A, 24B, 25A, 25B, and 25C of two types of switch, i.e. the open switch 24 and the latch switch 25, are combined together into the switch connector 6. However, by increasing the number of output terminals, plural types of switch may be employed. In addition, because the output terminal can be grounded by means of the wire harnesses 7, a common earth terminal can be jointly used by the open switch 24 and the latch switch 25 by electrically connecting the wire harnesses 24A and 25C of the open switch 24 and the latch switch 25 respectively to a common output terminal 66. Therefore, the number of output terminals of the switch connector 6 may be drastically reduced, resulting in a decrease in costs.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An actuator for driving an operating mechanism that operates an operated member of a vehicle by a driving of an electric drive source comprising:
   a housing for supporting the electric drive source;
   a detecting means for detecting an operation status of the operated member or the operating mechanism, the detecting means being arranged outside the housing;
   a switch connector including a main body and an output terminal mounted on the main body and provided as an electric path from the detecting means;
   a power feeding connector formed on the housing and including an input terminal provided as an electric path to the electric drive source, a first engaging portion, and a second engaging portion onto which the main body of the switch connector is fit; and
   a third connector positioned within the first engaging portion and including one third connection terminal electrically connected to the output terminal and an other third connection terminal electrically connected to the input terminal;
   the output terminal extending through a through-hole formed in the power feeding connector and into the first engaging portion so as to be directly engaged with the one third connection terminal;
   the input terminal extending into the first engaging portion so as to be directly engaged with the other third connection terminal.

2. The actuator according to claim 1, wherein the input terminal and the output terminal are arranged in parallel to each other inside the first engaging portion.

3. The actuator according to claim 2, wherein the first engaging portion faces an inner panel of an opening and closing member, and the actuator is provided within an opening and closing member of the vehicle.

4. The actuator according to claim 1, wherein the detecting means is electrically connected to the output terminal of the main body of the switch connector by way of a wire harness extending outside the housing.

5. The actuator according to claim 1, wherein the detecting means comprises a first switch, and wherein the output terminal mounted on the main body of the switch connector is a first output terminal, and further comprising a second switch mounted outside the housing and electrically connected to the second output terminal.

6. The actuator according to claim 1, wherein the switch connector and the power feeding connector are connected to one another by way of a convex portion engaging a concave portion, with an interposed seal member.

7. The actuator according to claim 1, the output terminal having a terminal connection portion led to the second engaging portion and a harness connection portion formed at the opposite side of the terminal connection portion, and the harness connection portion is provided as an electric path from the detecting means.

8. A vehicle-mounted electrically operated device comprising:
   an actuator including an electric drive source controlled by a control means mounted on the vehicle and receiving an electric power from a power source mounted on the vehicle;
   an operating mechanism for operating an operated member of the vehicle by driving of the electric drive source;
   a detecting means for detecting an operation status of the operated member or the operating mechanism and outputting a detection signal to the control means, the detecting means being arranged outside the actuator;
   a first connector including a main body and a first connection terminal for electrically connecting the detecting means to the control means, the first connection terminal being mounted on the main body;
   a second connector formed on the actuator and with which the main body is engageable and disengageable, the second connector including a second connection terminal for electrically connecting the electric drive source to the control device, a first engaging portion, and a second engaging portion onto which the first connector is fit; and
   a third connector positioned within the first engaging portion and including one third connection terminal electrically connected to the first connection terminal and an other third connection terminal electrically connected to second connection terminal;
   the first connection terminal extending through a through-hole formed in the second connector and into the first engaging portion so as to be directly engaged with the one third connection terminal;

the second connection terminal extending into the first engaging portion so as to be directly engaged with the other third connection terminal.

9. The vehicle-mounted electrically operated device according to claim 8, wherein the first engaging portion is provided to face the second engaging portion across the through-hole.

10. The vehicle-mounted electrically operated device according to claim 9, wherein the actuator is accommodated in an opening and closing member of the vehicle together with the operating mechanism and the operated member, and the first engaging portion faces an inner panel of the opening and closing member.

11. The vehicle-mounted electrically operated device according to claim 8, wherein the actuator includes a housing for supporting the electric drive source and on which the second connector is integrally formed.

12. The vehicle-mounted electrically operated device according to claim 11, wherein the actuator is accommodated in an opening and closing member of the vehicle together with the operating mechanism and the operated member, and the first engaging portion faces an inner panel of the opening and closing member.

13. The vehicle-mounted electrically operated device according to claim 8, wherein the detecting means is electrically connected to the first connection terminal of the main body of the first connector by way of a wire harness extending outside the actuator.

14. The vehicle-mounted electrically operated device according to claim 8, wherein the detecting means comprises a first switch, and further comprising a second switch mounted outside the actuator and electrically connected to a further connection terminal of the first connector.

15. The vehicle-mounted electrically operated device according to claim 8, wherein the first connector and the second connector are connected to one another by way of a convex portion engaging a concave portion, with an interposed seal member.

16. The actuator according to claim 8, the first connection terminal having a terminal connection portion led to the second engaging portion and a harness connection portion formed at the opposite side of the terminal connection portion, and the harness connection portion is provided as an electric path from the detecting means.

* * * * *